United States Patent
Blanco et al.

(10) Patent No.: US 10,061,835 B2
(45) Date of Patent: Aug. 28, 2018

(54) ESTABLISHING USER-CONFIDENCE LEVELS OF DATA INPUTS

(71) Applicant: MOTOROLA SOLUTIONS, INC, Schaumburg, IL (US)

(72) Inventors: Alejandro G Blanco, Fort Lauderdale, FL (US); Alain D Abbate, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 304 days.

(21) Appl. No.: 14/064,600

(22) Filed: Oct. 28, 2013

(65) Prior Publication Data
US 2015/0121292 A1    Apr. 30, 2015

(51) Int. Cl.
| G06F 3/0484 | (2013.01) |
| G06F 3/0482 | (2013.01) |
| G06F 17/30 | (2006.01) |
| G06F 17/24 | (2006.01) |

(52) U.S. Cl.
CPC ...... *G06F 17/30595* (2013.01); *G06F 17/243* (2013.01)

(58) Field of Classification Search
CPC .... G06F 3/0237; G06F 3/0481; G06F 3/0482; G06F 3/04842; G06F 17/30595; G06F 17/30864
See application file for complete search history.

(56) References Cited

U.S. PATENT DOCUMENTS

| 6,711,577 | B1 | 3/2004 | Wong et al. | |
| 7,111,243 | B1* | 9/2006 | Ballard | G06F 8/38 |
| | | | | 707/999.102 |
| 7,305,129 | B2 | 12/2007 | Chellapilla et al. | |
| 7,913,184 | B1* | 3/2011 | Zhang | G06F 17/243 |
| | | | | 715/224 |
| 8,117,540 | B2 | 2/2012 | Assadollahi | |

(Continued)

FOREIGN PATENT DOCUMENTS

EP    2063613 A1    5/2009

OTHER PUBLICATIONS

PCT International Search Report dated Apr. 22, 2015 for Counterpart Application PCT/US2014/061312.

*Primary Examiner* — Kevin L Young
*Assistant Examiner* — Parmanand D Patel
(74) *Attorney, Agent, or Firm* — Barbara R. Doutre

(57) ABSTRACT

An embodiment takes the form of a method carried out by a computing system comprising a processor and instructions for carrying out the method. The method includes (i) presenting via a user interface a plurality of data-input fields having an associated default order for user entry of respective values in the respective data-input fields, (ii) receiving respective values entered via the user interface in the respective data-input fields, (iii) storing a respective current counter value of an incrementing counter in association with receiving each respective entered value, (iv) establishing a respective user-confidence level for each of one or more of the respective entered values, wherein each established user-confidence level is set based at least in part on a comparison of the associated default order with a set of one or more of the stored counter values, and (v) outputting one or more of the established user-confidence levels.

28 Claims, 4 Drawing Sheets

200

| DATA-INPUT FIELD | SUGGESTED ORDER (202) | USER'S ORDER (204) | CONFIDENCE LEVEL (206) |
|---|---|---|---|
| ETHNICITY 102 | 1ST | (=) 1ST | |
| GENDER 104 | 2ND | (=) 2ND | |
| HAIR 106 | 3RD | (=) 3RD | |
| EYES 108 | 4TH | (=) 4TH | |
| HEIGHT 110 | 5TH | (<) 6TH | |
| WEIGHT 112 | 6TH | (<) 7TH | |
| DATE OF BIRTH 114 | 7TH | (>) 5TH | |

(56) References Cited

U.S. PATENT DOCUMENTS

| | | | |
|---|---|---|---|
| 8,656,273 B1* | 2/2014 | Tifford | G06Q 10/10 |
| | | | 705/3 |
| 2005/0015730 A1* | 1/2005 | Gunturi | G06F 9/4443 |
| | | | 715/777 |
| 2005/0273778 A1* | 12/2005 | Bixler | G06F 9/4446 |
| | | | 717/165 |
| 2007/0172809 A1* | 7/2007 | Gupta | G09B 3/00 |
| | | | 434/350 |
| 2008/0215976 A1* | 9/2008 | Bierner | G06F 17/243 |
| | | | 715/708 |
| 2008/0267505 A1 | 10/2008 | Dabet et al. | |
| 2009/0248643 A1* | 10/2009 | Wasson | G06F 17/3082 |
| 2010/0017742 A1* | 1/2010 | Rhodes | G06F 17/243 |
| | | | 715/780 |
| 2011/0066605 A1 | 3/2011 | Elbaz | |
| 2011/0125783 A1* | 5/2011 | Whale | G06F 17/30011 |
| | | | 707/769 |
| 2011/0214067 A1* | 9/2011 | Tanaka | G06F 3/0481 |
| | | | 715/745 |
| 2012/0029910 A1 | 2/2012 | Medlock et al. | |
| 2012/0047135 A1* | 2/2012 | Hansson | G06F 17/3064 |
| | | | 707/731 |
| 2012/0088222 A1* | 4/2012 | Considine | G09B 5/00 |
| | | | 434/362 |
| 2012/0106854 A1 | 5/2012 | Tang et al. | |
| 2012/0130937 A1* | 5/2012 | Leon, Jr. | G06Q 10/0635 |
| | | | 706/52 |

* cited by examiner

*200*

| DATA-INPUT FIELD | SUGGESTED ORDER ⌐202 | USER'S ORDER ⌐204 | CONFIDENCE LEVEL ⌐206 |
|---|---|---|---|
| ETHNICITY *102* | 1ST | (=) 1ST | |
| GENDER *104* | 2ND | (=) 2ND | |
| HAIR *106* | 3RD | (=) 3RD | |
| EYES *108* | 4TH | (=) 4TH | |
| HEIGHT *110* | 5TH | (<) 6TH | |
| WEIGHT *112* | 6TH | (<) 7TH | |
| DATE OF BIRTH *114* | 7TH | (>) 5TH | |

*FIG. 2*

ESTABLISHING USER-CONFIDENCE LEVELS OF DATA INPUTS

BACKGROUND OF THE INVENTION

Computer-based forms provide a convenient means for collecting information. The information received could be used to complete a purchase of airline tickets, to provide access to an internet-based discussion forum, or to obtain survey results, among many other possible examples. Law enforcement uses such forms to collect information regarding criminal suspects—information such as a suspect's ethnicity, gender, hair color, eye color, height, weight, and date of birth, among other examples.

A user entering information into a computer-based form may have more confidence in the accuracy of some provided information (as compared to other provided information). For example, a police officer may suspect that a criminal perpetrator has dyed his or her hair. When entering information about the perpetrator into a computer-based form, the officer may provide information regarding the perpetrator's hair color, even though the officer has little confidence that the provided information is accurate. The computer-based form may not provide a way for the officer to indicate the level of his or her confidence in the accuracy of the provided information. Even if the form provides a way to indicate the officer's confidence that the provided information is accurate, the manner of indicating that confidence may nonetheless be cumbersome or inefficient, thus reducing the likelihood that the officer would provide any indication of that confidence. Accordingly, there is a need for establishing the officer's (or other user's) confidence in the accuracy of the provided information in a way that is convenient for the officer (or other user).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a table showing respective user-confidence levels for respective data-input fields, in accordance with some embodiments.

Figure 1:
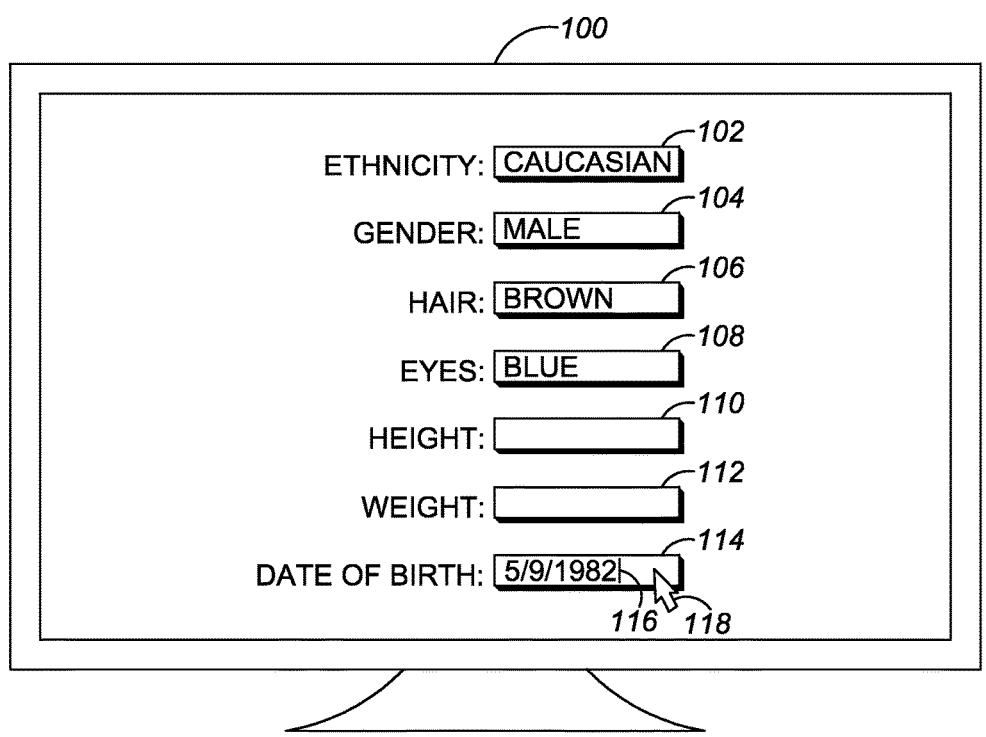
FIG. 1 illustrates an example user-interface presentation, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An embodiment takes the form of a method carried out by a computing system. The computing system comprises a processor and non-transitory data storage containing instructions executable by the processor for carrying out the method. The method includes presenting, via a user interface, a plurality of data-input fields having an associated default order for user entry of respective values in the respective data-input fields. The method further includes receiving respective values entered via the user interface in the respective data-input fields and storing a respective current counter value of an incrementing counter in association with receiving each respective entered value. The method further includes establishing a respective user-confidence level for each of one or more of the respective entered values, wherein each established user-confidence level is set based at least in part on a comparison of the associated default order with a set of one or more of the stored counter values. The method further includes outputting one or more of the established user-confidence levels.

I. Introduction

The arrangement of data-input fields of a computer-based form may suggest the order in which values should be entered into the data-input fields. For example, FIG. 1 illustrates an example user-interface presentation, in accordance with some embodiments. As shown, user-interface display 100 presents a plurality of vertically-arranged data-input fields 102 through 114. The vertical arrangement of the data-input fields might suggest that respective values in the data-input fields should be entered from top (data-input field 102) to bottom (114). A user-interface keyboard (or other user-interface component) may receive respective values for each of the data-input fields. One or more of the data-input fields may include a respective label (as shown) indicating the type of information that the respective data-input field is to receive.

Should the user-interface presentation suggest an order of user entry, it may be possible to predetermine a default order (an expected or anticipated order of data entry) and then determine a user's confidence in the accuracy of any respective value of a respective data-input field. That determination could be made by comparing the associated order of user entry with the actual order in which the user entered respective values in the data-input fields. If the user's actual order of entry differs from the order suggested by the arrangement of the data-input fields, then it could be determined that the user's confidence in a given value's accuracy is relatively lower or higher than the confidence in the accuracy of other values.

FIG. 2 is a table showing, for each of data-input fields 102 through 114, a suggested user-entry order 202 of the data-input-field value, an actual user-entry order 204, and a user-confidence level 206 in the accuracy of the data-input-field value. The associated default order of user entry of values in data-input fields 102 through 114 is first to seventh, respectively, owing in part to the vertical arrangement of the data-input fields. As shown, the user entered (in order) values in the top four data-input fields 102, 104, 106 and 108, then entered a value in the seventh (and last) data-input field 114, and finally entered values in the fifth and sixth data-input fields 110 and 112. A respective user-confidence level for each data-input field is determined based on the difference between the associated order and the actual order.

The user may have skipped entry of values in the fifth and sixth data-input fields 110 and 112 if, for example, the user was uncertain as to the accuracy of the values that the user would have otherwise provided. As another possibility, the user may have skipped to the seventh data-input field 114 if the user was very confident in the accuracy of the provided values (and thus wanted to skip to data-input fields for which values were "easy" to provide). By skipping entry of values in the fifth and sixth data-input fields 110 and 112 and proceeding to provide a value for the seventh data-input field 114, the user may have implicitly indicated a greater confidence in the accuracy of the values of data-input fields 102, 104, 106, 108, and 114 as compared to the confidence in the accuracy of the values in data-input fields 110 and 112.

Thus, if the manner in which the data-input fields are arranged or otherwise presented on a display suggests a default order in which values should be entered into the data-input fields, and if the user's actual order of entry of values can be determined, then it may be possible to determine the user's confidence in the accuracy of one or more of those values.

II. Example Computing System

Figure 3:
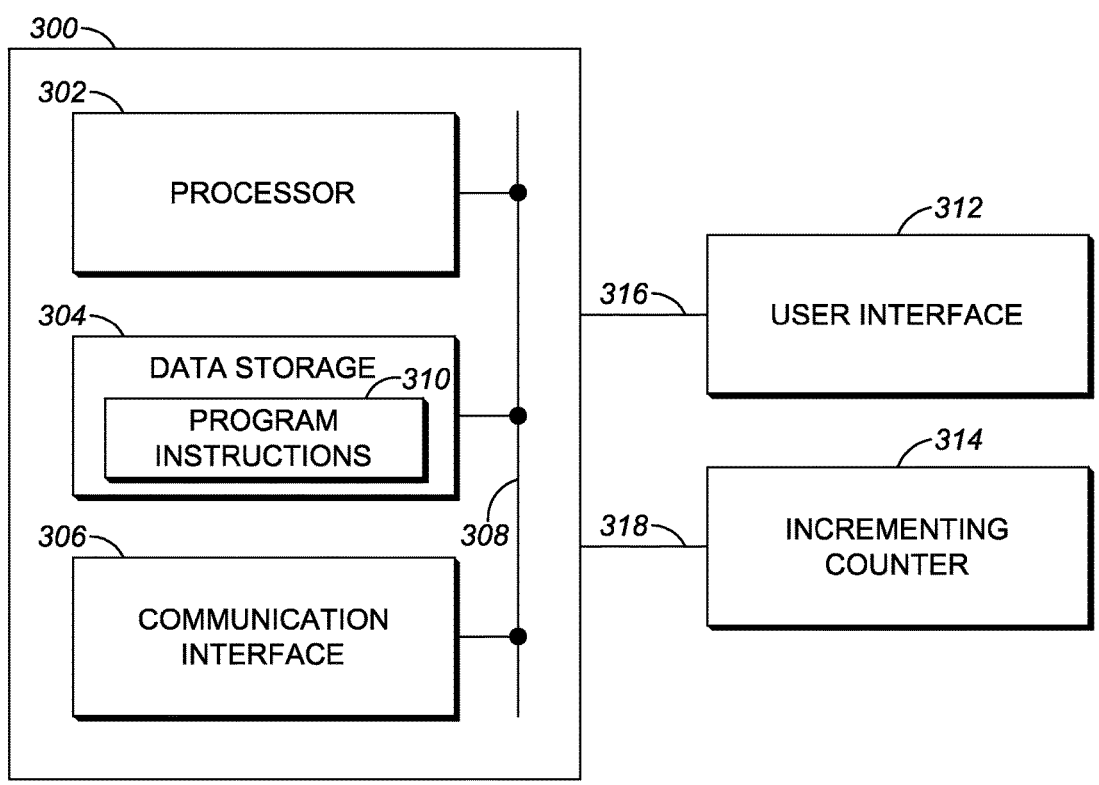
FIG. 3 is a block diagram of a computing system, in accordance with some embodiments.

FIG. 3 is a block diagram of a computing system, in accordance with some embodiments. As shown, computing system 300 includes a processor 302, a non-transitory data storage 304, and a communication interface 306, all of which are interconnected via system bus 308. The computing system may be communicatively connected to user interface 312 and incrementing counter 314 via respective communication links 316 and 318. The computing system could include additional and components not illustrated in FIG. 3, and may not necessarily include all of the illustrated components.

Processor 302 may take the form of one or more general-purpose processors and/or one or more special-purpose processors, and may be integrated in whole or in part with data storage 304 and/or communication interface 306. Data storage 304 may store program instructions 310, user-confidence levels, counter values, user-interface data, search queries, and/or reports, among numerous other possibilities. The data storage may take the form of a non-transitory computer-readable medium such as a hard drive, a solid-state drive, an EPROM, a USB storage device, a CD-ROM disk, a DVD disk, any other non-volatile storage, or any combination of these, to name just a few examples. Program instructions 310 may comprise machine-language instructions executable by processor 304 to carry out various functions described herein.

Communication interface 306 may be any component capable of performing the communication-interface functions described herein. The communication interface could facilitate communication include or take the form of an Ethernet, Wi-Fi, Bluetooth, digital visual interface (DVI), and/or universal serial bus (USB) interface, among many other possibilities. The communication interface could be configured to facilitate communication among components of computing system 300 (perhaps via system bus 308) and/or other components such as user-interface 312 or incrementing counter 314 (perhaps via communication links 316 and 318). The system bus and communication links could take the form on any link capable of facilitating communication and could include or incorporate other components not shown in FIG. 3. For example, the links could communicatively connect computing system 300 and user interface 312 (or incrementing counter 314) via the Internet, perhaps using one or more cable modems, routers, and/or switches, among other possibilities. Those having skill in the art will recognize that communication interface 306, system bus 308, and communication links 316 and/or 318 could take other forms as well.

User interface 312 may be any component capable of carrying out the user-interface functions described herein. The user interface may be configured to both receive input from a user and output information to the user. User input might be achieved via a keyboard, a mouse, or another component communicatively linked to a general-purpose computer. As another possibility, input may be realized via a touchscreen display of a smartphone or tablet device. Output may be provided via a computer monitor or a loudspeaker (such as a computer speaker), again possibly communicatively linked to a general-purpose computer. And some components may provide for both input and output, such as the aforementioned touchscreen display. Those having skill in the art will understand that user interface 312 may take numerous other forms as well.

Incrementing counter 314 may be any component capable of carrying out the incrementing-counter functions described herein. The counter could take the form of hardware and/or software that stores a number of times that a particular event has occurred. For example, the counter could take the form of a clock and/or could store the current time or the number of seconds or clock-generator cycles that have elapsed since a given time or event. The counter may increment the stored number upon occurrence of the event, such as every second or every one hundred clock cycles, as examples. Incrementing counter 314 may take other forms as well without departing from the scope of the claims.

III. Example User Interface

Referring back to FIG. 1, data-input fields 102 through 114 may take the form of respective text boxes. As another possibility, any or all of the data-input fields could take the form of one or more buttons, drop-down lists, list boxes, combo boxes, check boxes, radio buttons, cycle buttons, data grids, and/or sliders. Those having skill in the art will understand that the data-input fields may take other forms as well.

In an embodiment, respective labels are presented next to each of data-input fields 102 through 114. As noted above, the labels may indicate the information that the data-input field is to receive. For example, as illustrated in FIG. 1, text labels reading "ethnicity," "gender," "hair," "eyes," "height," "weight," and "date of birth" are presented to the immediate left of data-input fields 102 through 112. Though presented as text labels, the data-input-field labels could take other forms such as respective icons, pop-up notifications, and/or tooltips, among other examples. Further, not all data-input fields will necessarily include a label. Though presented to the immediate left of the data-input fields, the data-input-field labels could be presented elsewhere on user-interface display 100.

As shown in FIG. 1, user-interface display 100 further presents text cursor 116 and mouse pointer 118. In an embodiment, text cursor 116 indicates the focus of the user-interface presentation. The focus of a presentation refers to the data-input field (or other user-interface element) into which values received via the user interface are entered. Generally, only a single data-input field has the focus at any given time. The text cursor might blink so as to assist the user in locating the text cursor on the display. The focus of the user-interface presentation may be indicated in other ways as well, such as by setting a unique color of the data-input field with the focus. Navigation commands received via a user-interface keyboard or other component could change the focus of the presentation to a different data-input field. Those having skill in the art will understand that text cursor 116 may take other forms as well.

Mouse cursor 118 may be used to set the focus to a desired data-input field. For example, the mouse cursor might be moved to the desired data-input field by operating a computer mouse. Pressing a mouse button while the mouse cursor is over the desired data-input field may then cause the focus to switch to that data-input field. Mouse cursor 118 may also take other forms.

It should be understood that additional and/or different objects could be presented via user interface 312, and that not all illustrated objects need be presented. For example, user interface 312 could present additional and/or fewer data-input fields and may include one or more headers or buttons for facilitating user entry of values. Embodiments might be employed in which more than one data-input field has the focus at any given time. For example, text received via the user interface might be directed to two data-input fields such that the same received text is entered simultaneously into both data-input fields. Other variations are possible as well.

IV. Example Operation

Figure 4:
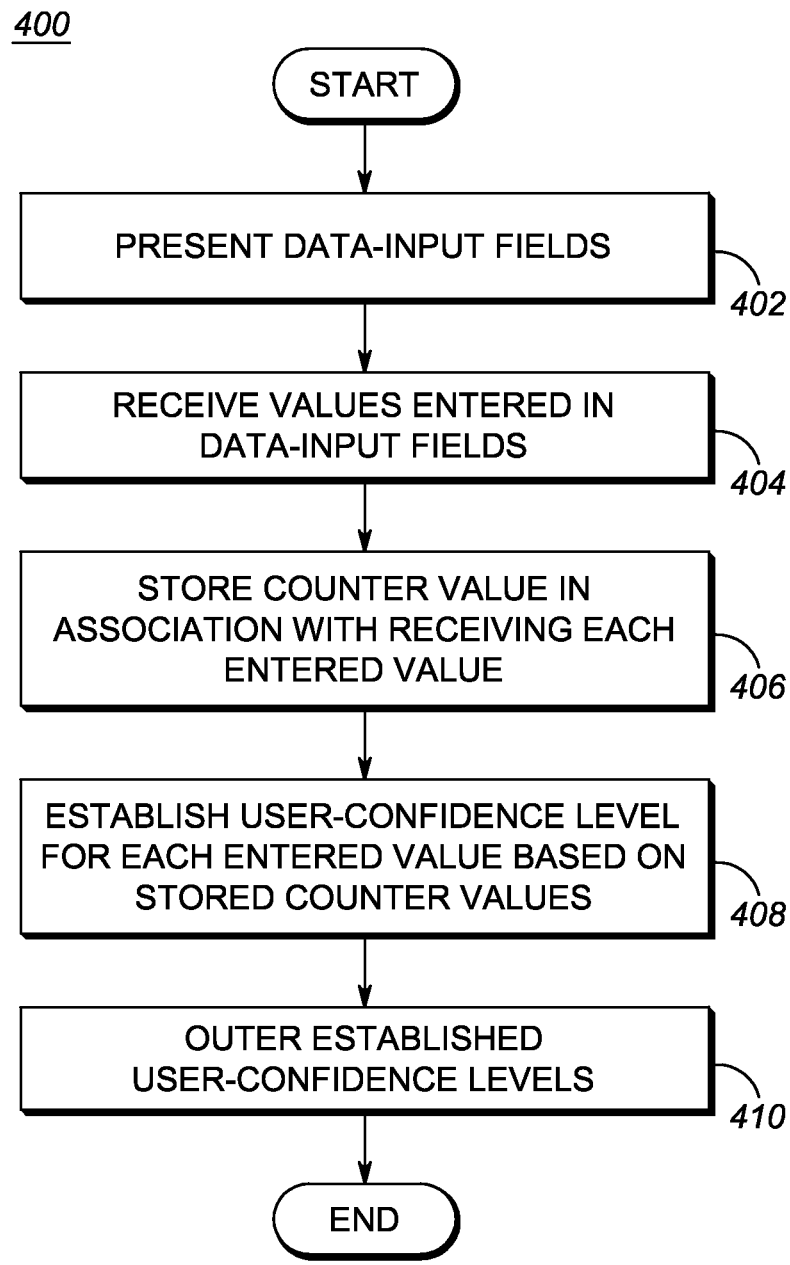
FIG. 4 is a flowchart of a method, in accordance with some embodiments.

FIG. 4 is a flowchart of a method, in accordance with example embodiments. As shown, method 400 begins at step 402 with computing system 300 presenting via user interface 312 a plurality of data-input fields 102 through 114. The data-input fields are presented in a manner suggestive of a default order for user entry of respective values in the respective data-input fields. The suggestive nature of the layout of the fields may be used to predetermine the associated default order of data entry used by the system. This may be done automatically using predetermined rules (left-to-right, top-to-bottom), or may be predetermined by a manual process based on empirical data collected from users, or by a data entry professional's assessment, or by other means.

Presenting the plurality of data-input fields 102 through 114 could include sequentially presenting different sets of one or more of the data-input fields. For example, the data-input fields could be presented using a wizard interface. The user interface could present a first set of data-input fields and a button labeled "Next." The user interface could receive respective values for the data-input fields and subsequently receive a user-interface command associated with the "Next" button (possibly as a result of a user clicking the button with a user-interface mouse). The user interface could responsively remove the first set of data-input fields from the presentation and present a second set of data-input fields into which values could be entered. A third, fourth, or more data-input sets might be presented in this manner.

In another embodiment, sequentially presenting the data-input fields includes presenting the data-input fields in a cascading manner. For example, upon a data-input field receiving a value indicating that a criminal suspect has a prior history of criminal conduct, a second set of data-input fields may be presented for receiving values regarding that prior criminal conduct. If one of the data-input fields in the second set of fields indicate the prior criminal conduct was of a certain nature (e.g., possession of a controlled substance), the user interface might present a third set of data-input fields for receiving values indicating additional details of the given criminal conduct (e.g., values for indicating the amount of the controlled substance). Those having skill in the art will recognize that sequentially presenting that data-input fields could take other forms as well. Additionally or alternatively, presenting the plurality of data-input fields could includes simultaneously presenting all of the data-input fields.

In an embodiment, presenting the plurality of data-input fields 102 through 114 includes navigationally linking a given data-input field with one or more other data-input fields. Each of the linked data-input fields may be associated with a navigation command (such as one or more keyboard keys or mouse buttons). Upon receiving the navigation command via user-interface 312, computing system 300 may set the focus of the user-interface presentation to the linked data-input field associated with the navigation command. For example, if the presented data-input fields are vertically arranged, then a linked data-input field above a given data-field might be associated with an up arrow key, while a linked data-input field below the given data-input field might be associated with a down arrow key. Linked data-input fields positioned to the right and left of the given data-field might be associated with a right and a left arrow key, respectively. It should be understood that the respective navigation commands could take other forms as well, such as an "enter" key, a "page down" key, a "page up," key, or any combination of these, among other possibilities.

In an embodiment, one of the linked data-input fields of a given data-field is a "next" data-input field. If data-input fields 102 through 114 are vertically arranged, then the next data-input field might be positioned below the given data-input field. The vertical arrangement of the data-input fields, along with the top-to-bottom movement of the focus, could suggest a top-to-bottom order for user entry of respective values in the respective data-input fields. Similarly, a left-to-right order for user entry might be suggested if the data-input fields are horizontally arranged and if the next data-input field is positioned to the right of the given data-input field. Thus, these characteristics may be used to determine a default order. Each of the respective next data-input fields of respective data-input fields 102 through 114 might be associated with a user-interface command—for example, a tab key.

In an embodiment, presenting data-input fields 102 through 114 could include presenting the data-input fields in a manner that requires entry of respective values in one or more of data-input fields. For example, in addition to the data-input fields, a "Submit" or "Next" button might be presented via user interface 312, the user selection of which might be interpreted by computing system 300 as a request by the user to send any entered values to the computing system. However, before sending any entered values, the user interface might require that some or all of the data-input fields contain entered values. The user interface might present a dialog box, label, or other indication that entry of a respective value is required. The indication could be presented in response to the user selecting the "Submit" or "Next" button (e.g., if a required data-input field does not contain a value) and/or presented before selection of the button (e.g., a data-input-field label that reads "required"). Requiring entry of values could take other forms as well.

It should be understood that the default order of entry of data-input fields 102 through 114 (and any user-entry order suggested by presentation of these data-input fields) could be based on language and/or cultural norms (possibly among other factors). For example, while English is typically read and written from left to right, many East-Asian scripts are read and written from right to left. Thus, a horizontal arrangement of the data-input fields could suggest a left-to-right order to some users, while perhaps suggesting a right-to-left order to other users. The default order of entry could take into account whether the user reads right to left or reads left to right. When establishing respective user-confidence levels for respective entered values, the computing system might take into account the location of the user—e.g., Chongqing in China versus Los Angeles in the United States—a consideration that may assist in establishing the direction in which the user generally reads and writes.

Returning again to FIG. 4, a step 404, computing system 300 receives respective values entered via user interface 312 in respective data-input fields 102 through 114. As mentioned above, the user interface could include a keyboard and/or a mouse (among other possibilities), and receiving the respective values via the user interface could include receiving the values via the keyboard, mouse, or other user-interface component. Navigation commands might also be received via the user interface. The received values could be stored in data-storage 304. Other variations are possible as well.

The method continues at step 406 with the computing system storing a respective current counter value of incrementing counter 314 in association with receiving each respective entered value. In an embodiment, counter 314 increments in response to computing system 300 receiving an entered value. For example, the counter may be initially set to a value of zero. Upon receiving an entered value for data-field 102, the counter may be incremented to a value of one and that incremented value could be stored is association with the entered value. As another possibility, the value of the counter could be stored before the value of the counter is incremented. Each time an entered value is received for a respective one of data-input fields 102 through 114, the counter could be incremented by one and the incremented value could be stored in association with the respective received entered value. Table 1 below lists example respective counter values that might be stored with respective data-input fields 102 through 114.

TABLE 1

| Data-Input Field | Counter Value |
|---|---|
| Ethnicity 102 | 1 |
| Gender 104 | 2 |
| Hair 106 | 3 |
| Eyes 108 | 4 |
| Height 110 | 6 |
| Weight 112 | 7 |
| Date of Birth 114 | 5 |

As shown in Table 1, the user could skip entry of values for data-input fields 110 and 112 and instead enter a value for data-input field 114. In response to receiving the entered value for data-input field 114, the counter could be incremented to a value of five and that incremented value could be stored is association with the entered value. The user could then return to enter a value for data-input fields 110 and 112. In response, counter values of six and seven could be associated with data-input fields 110 and 112, respectively.

In an embodiment, counter 314 increments independent of the computing system 300 receiving of any of the respective entered values. The counter may be set initially to a value of zero, to a current time, and/or any other number, among other possibilities. The counter might increment by one (or some other value) every second, hour, day, clock cycle, or other event. The counter might increment in accordance with a periodic and/or a non-periodic function. For example, Table 2 below lists example respective counter values that might be stored independent of the computing system 300 receiving of any respective entered values. The counter values in Table 2 are stored as Unix timestamps (the number of seconds that have elapsed since Jan. 1, 1970 at 12:00 am GMT), and the counter is incremented by a value of one every second. Each time an entered value is received, the current counter value may be stored in association with the value.

TABLE 2

| Data-Input Field | Counter Value |
|---|---|
| Ethnicity | 1380578884 |
| Gender | 1380578887 |
| Hair | 1380578892 |
| Eyes | 1380578900 |
| Height | 1380578939 |
| Weight | 1380578970 |
| Date of Birth | 1380578912 |

At step 408, computing system 300 establishes a respective user-confidence level for each of one or more of the respective entered values. Each established user-confidence level may be set based at least in part on a comparison of the associated default order with a set of one or more of the stored counter values.

Establishing the given user-confidence level could include setting the given user-confidence level to be different from (greater than or less than) a default user-confidence level. For example, the respective user-confidence levels 208 of data-input fields 102 through 108 as illustrated in FIG. 2 might be set to the default user-confidence level (as shown by the respective vertical confidence-indicator lines bisecting the respective horizontal confidence spectrums). The respective user-confidence levels of data-input fields 110 and 112 may be less than the default user-confidence level, while the user-confidence level of data-input field 114 may be greater than the default user-confidence level.

In an embodiment, establishing a given user-confidence level for a given entered value includes establishing the given user-confidence level based at least in part on making a determination that the stored counter values indicate a departure from the suggested default order. The departure could include skipping one or more data-input fields and proceeding directly to the given data-input field. For example, as illustrated in FIG. 2, the counter values could be interpreted by computing system 300 as a user entering values for data-input fields 102 through 108, skipping data-input fields 110 and 112, and proceeding directly to data-input field 114. Proceeding directly to data-input field 114 could be interpreted by computing system 300 as the user having a greater confidence in the accuracy of the value of data-input field 114 as compared to data-input fields 102 through 108 and/or skipped data-input fields 110 and 112 (as illustrated in FIG. 2 by the confidence-indicator line for data-input field 114 positioned to the right of the indicators for data-input fields 102 through 112).

The departure from the suggested default order could include skipping a given data-input field, proceeding through one or more ensuing data-input fields, and thereafter returning to the given data-input field. For example, skipping entry of values in data-input fields 110 and 112 could be interpreted by computing system 300 as the user having less confidence in the accuracy of values of respective data-input fields 110 and 112 as compared to data-input fields 102 through 108 and/or data-input fields 114 (as illustrated by the confidence-indicator lines for data-input fields 110 and 112 positioned to the left of the indicators for data-input fields 102 through 108 and 114).

The departure from the suggested default order could include skipping a required data-input field, hitting a "Next" or "Submit" button, and thereafter returning to the required data-input field. For example, a user might attempt to submit values for data-input fields 102 through 108 and 112 through 114, but not for data-input field 110. Upon user selection of the "Next" or "Submit" button, user interface 312 may present an indication that a respective value is required for data-input field 110. The user may then return to data-input 110, enter a respective value, and then select the button, in response to which the user interface sends the values to computing system 300. The user's attempted submission of, for example, a blank, empty, or null value for a required data-input field may be interpreted by computing system 300 as the user having low confidence in the accuracy of any subsequently-entered value for that data-input field. As another possibility, the submission of a blank value for the last (and in this example, required) data-input field in the default order (e.g., as suggested by the presentation of the data-input fields) may be interpreted as simple user oversight in entry of a value for that data-input field and thus might not be interpreted as the user having a higher or lower user-confidence level for any subsequently-entered value for that data-input field. Other variations are possible as well.

In an embodiment, the departure from the suggested default order could include entering an initial value in the given data-input field and thereafter entering a modified value in the given data-input field. The departure could be interpreted by computing system 300 as the user having relatively more confidence in the accuracy of the modified value as compared to the initial value. As another possibility, the departure could be interpreted as the user having relatively higher or lower confidence in the accuracy of the modified value relative to the respective values in other data-input fields. Respective counter values could be stored in association with the respective initial and modified values.

In an embodiment, counter 314 is a clock that increments independent of computing system 300 receiving of any respective entered values. Establishing a given user-confidence level for a given entered value includes establishing the given user-confidence level based at least in part on determining that the stored counter values indicate a pause of more than a threshold amount of time between entry of a value in a previous data-input field and entry of a value in the given data-input field. The threshold amount of time could be established based on an expected or average time users typically pause between entry of respective values in data-input fields. Thus a pause greater than the threshold could be interpreted as the user being unable to recall an appropriate value for the previous data-input field and thus having lower confidence in the accuracy of the value of the previous data-input field.

Those having skill in the art will recognize that establishing respective user-confidence levels for entered values may be accomplished in other ways, and that the embodiments described above are just a few examples.

A respective user-confidence level could be expressed as a percentage likelihood (e.g., 75%) that the entered value is accurate. As another possibility, if a respective entered value is expressed in a given unit of measurement (e.g., inches), then the respective user-confidence level could be expressed as a range (e.g., ±5 inches of the entered value) within which there is a threshold likelihood (e.g., 95%) that the entered value lies. A respective user-confidence level could be expressed in other forms as well.

At step 410, computing system 300 outputs one or more of the established user-confidence levels. Outputting the established levels could include storing the levels in data storage 304 and/or presenting the levels via user interface 312. As another possibility, outputting the established user-confidence levels could include transmitting the levels to a receiving device such as a computer server, desktop computer, notebook computer, tablet, and/or smartphone, among other possibilities. The computing system might submit a search query using the levels or include the levels in a report. Those having skill in the art will recognize that the output could be any combination of these examples, and could take other forms as well.

In an embodiment, outputting one or more of the established user-confidence levels includes (i) making a determination that the received values of data-input fields 102 through 114 are similar to a second set of received values and (ii) responsively outputting an indication of the similarity. For example, computing system 300 might receive (and establish user-confidence levels for) two sets of values as a result of two different officers entering values into data-input fields 102 through 114 at different times for two different incidents. It may be the case that, for both sets of values, the respective user-confidence levels of some data-input fields (e.g., fields 102 through 106 and 112 through 114) are relatively high while the respective user-confidence levels of other data-input fields (e.g., field 108 and 110) are relatively low. Moreover, it may further be the case that the values of the respective data-input fields having relatively high user-confidence levels are similar or identical between the sets, while the non-matching values have relatively low user-confidence levels. Upon establishing these similarities, computing system 300 might output an indication that the characteristics of a suspect in one incident (represented by one set of the values) are similar to the characteristics of a suspect in another incident (represented by the other set of values), thus possibly indicating that the suspects in the two incidents are the same individual. Other variations are possible as well: for example, respectively high and low user-confidence levels for respective values of a given data-input field, along with relatively high confidence levels for the same or similar values of other respective data-input fields, might likewise indicate that the suspects in the two incidents are the same individual.

As another possibility, upon establishing that two sets of values are similar (or are otherwise related), computing system 300 may select, from among the two sets, values for inclusion in a composite set. As just one example, for a given data-input field, if the established user-confidence level for a value in a first set is higher than the established user-confidence level for a value in a second set, then the computing system might select for inclusion in the composite set the value from the first set (the selected value having the higher user-confidence level). For a different data-input field, the computing system might select for inclusion in the composite set the value from the second set. By selecting for inclusion in the composite set those values with the higher user-confidence levels for respective data-input fields, the computing system can select a set of values that may be more accurate than the values in the respective first and second sets. And certainly other examples are possible.

V. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method carried out by a computing system comprising a processor and non-transitory data storage containing instructions executable by the processor for carrying out the method, the method comprising:

presenting via a user interface display, a plurality of data-input fields in a computer-based form having an associated default order for user entry of respective values in the respective data-input fields, wherein arrangement of the data-input fields of the computer-based form suggest the associated default order in which the respective values should be entered responded to;

receiving respective user entered values via the user interface in the respective data-input fields;

storing a respective current counter value of an incrementing counter in association with receiving each respective user entered value;

establishing a respective user-confidence level for each of one or more of the respective user entered values, wherein each established user-confidence level is set based at least in part on a comparison of the associated default order with a set of one or more of the stored counter values, wherein the stored counter values indicate a departure from the default order; and outputting, to the user interface display, the established user-confidence levels, and wherein departure from the associated default order results in displaying higher and lower user-confidence levels of the user entered values as compared to the user-confidence levels associated with the default order, wherein departure from the associated default order further establishes greater user-confidence levels for data-input fields which are entered as compared to data-input fields which are skipped, without requiring user entry of a confidence level.

2. The method of claim 1, wherein presenting the plurality of data-input fields via the user interface display comprises simultaneously presenting all of the data-input fields via the user interface, wherein the default order includes one or more of a top-to-bottom order, a bottom-to-top order, a left-to-right order, and a right-to-left order.

3. The method of claim 1, wherein presenting via the user interface display the plurality of data-input fields having an associated default order for user entry of respective values in the respective data-input fields comprises sequentially presenting different sets of one or more of the data-input fields.

4. The method of claim 3, wherein sequentially presenting different sets of one or more of the data-input fields comprises presenting the data-input fields using a wizard interface.

5. The method of claim 3, wherein sequentially presenting different sets of one or more of the data-input fields comprises presenting the data-input fields in a cascading manner.

6. The method of claim 1, wherein the counter responsively increments each time a user entered value is received.

7. The method of claim 1, wherein the counter increments independent of the receiving of any of the respective user entered values.

8. The method of claim 7, wherein the counter is a clock.

9. The method of claim 8, wherein establishing a given user-confidence level for a given user entered value received via a given data-input field comprises establishing the given user-confidence level based at least in part on making a determination that the stored counter values indicate a pause of more than a threshold amount of time between entry of a value in a previous data-input field and entry of a value in the given data-input field.

10. The method of claim 1, wherein establishing the given user-confidence level comprises setting the given user-confidence level to be different than a default user-confidence level.

11. The method of claim 10, wherein setting the given user-confidence level to be different than a default user-confidence level comprises setting the given user-confidence level to be less than a default user-confidence level.

12. The method of claim 10, wherein setting the given user-confidence level to be different than a default user-confidence level comprises setting the given user-confidence level to be greater than a default user-confidence level.

13. The method of claim 1, wherein establishing a given user-confidence level for a given user entered value received via a given data-input field comprises establishing the given user-confidence level based at least in part on making a determination that the stored counter values indicate a departure from the associated default order, the departure being skipping one or more data-input fields and proceeding directly to the given data-input field.

14. The method of claim 1, wherein establishing a given user-confidence level for a given user entered value received via a given data-input field comprises establishing the given user-confidence level based at least in part on making a determination that the stored counter values indicate a departure from the associated default order, the departure being skipping the given data-input field, proceeding through one or more ensuing data-input fields, and thereafter returning to the given data-input field.

15. The method of claim 1, wherein establishing a given user-confidence level for a given user entered value received via a given data-input field comprises establishing the given user-confidence level based at least in part on making a determination that the stored counter values indicate a departure from the associated default order, the departure being entering an initial value in the given data-input field and thereafter entering a modified value in the given data-input field.

16. The method of claim 15, wherein the stored counter values comprise respective counter values stored in association with the initial value and the modified value.

17. The method of claim 1, wherein outputting comprises one or more functions selected from the group consisting of storing in data storage, presenting via the user interface, transmitting to a receiving device, submitting a search query, and including in a report.

18. A computing system comprising:
 a processor; and
 non-transitory data storage containing instructions executable by the processor for carrying out a set of functions, the set of functions comprising:
  presenting via a user interface display, a plurality of data-input fields having an associated default order for user entry of respective values in the respective data-input fields;
  receiving user entered respective values via the user interface display in the respective data-input fields;
  storing a respective current counter value of an incrementing counter in association with receiving each respective user entered value;
  establishing a respective user-confidence level for each of one or more of the respective user entered values, wherein each established user-confidence level is set based at least in part on a comparison of the associated default order with a set of one or more of the stored counter values, wherein the stored counter values indicate a departure from the default order; and
  outputting, one or more of the established user-confidence levels to the user interface display, wherein the departure from the default order results in displaying higher and lower user-confidence levels of the user entered values as compared to user confidence levels displayed which are associated with the default order, wherein departure from the associated default order further establishes greater user-confidence levels for data-input fields which are entered as compared to data-input fields which are skipped, without requiring user entry of a confidence level.

19. The computing system of claim 18, wherein establishing a given user-confidence level for a given user entered value received via a given data-input field comprises establishing the given user-confidence level based at least in part on making a determination that the stored counter values indicate a departure from the associated default order, the departure being skipping the given data-input field, proceeding through one or more ensuing data-input fields, and thereafter returning to the given data-input field.

20. The computing system of claim 18, wherein establishing a given user-confidence level for a given user entered value received via a given data-input field comprises establishing the given user-confidence level based at least in part on making a determination that the stored counter values indicate a departure from the associated default order, the departure being entering an initial value in the given data-input field and thereafter entering a modified value in the given data-input field.

21. The method of claim 1, wherein the associated default order is automatically controlled by the computing system using predetermined rules.

22. The method computing system of claim 18, wherein the associated default order is automatically controlled by the computing system using predetermined rules.

23. The method of claim 1, wherein departure from the associated default order results from:

receiving respective user entered values via the user interface display in an actual entry order departing from the associated default order.

24. The computing system of claim 18, wherein departure from the associated default order results from:
receiving respective user entered values via the user interface display in an actual entry order departing from the associated default order.

25. The method of claim 1, further comprising:
storing the established user-confidence levels associated with the characteristics of the suspect in the criminal incident; and
outputting, to the user interface display, an indication in response to the characteristics of the suspect in the incident being similar to the characteristics of a suspect in another incident based on a similar set of confidence levels.

26. The computing system of claim 18, further comprising:
storing the established user-confidence levels associated with the characteristics of the suspect in the criminal incident; and
outputting, to the user interface display, an indication in response to the characteristics of the suspect in the incident being similar to the characteristics of a suspect in another incident based on a similar set of confidence levels.

27. The method of claim 1, wherein the received user entered values at the user interface display are officer entered inputs.

28. The computing system of claim 18, wherein the received user entered values at the user interface display are officer entered inputs.

* * * * *